No. 735,032. PATENTED JULY 28, 1903.
F. R. CARPENTER.
PROCESS OF SEPARATING PRECIOUS METALS.
APPLICATION FILED DEC. 5, 1899.
NO MODEL.
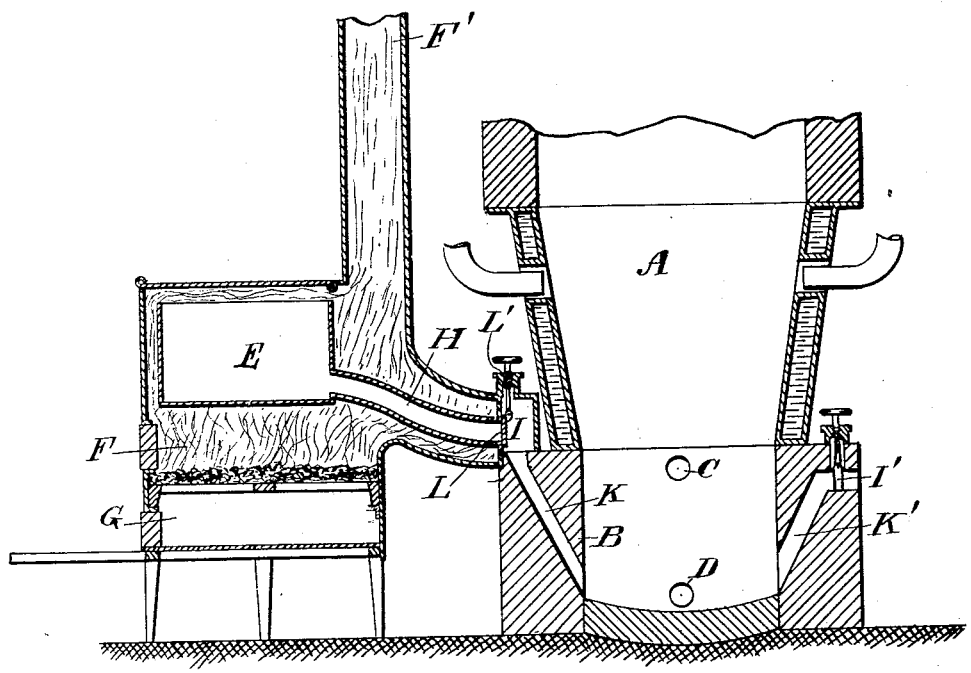

No. 735,032. Patented July 28, 1903.

UNITED STATES PATENT OFFICE.

FRANKLIN R. CARPENTER, OF DEADWOOD, SOUTH DAKOTA, ASSIGNOR OF ONE-HALF TO JOSEPH H. BERRY, OF DETROIT, MICHIGAN.

PROCESS OF SEPARATING PRECIOUS METALS.

SPECIFICATION forming part of Letters Patent No. 735,032, dated July 28, 1903.

Application filed December 5, 1899. Serial No. 739,227. (No specimens.)

*To all whom it may concern:*

Be it known that I, FRANKLIN R. CARPENTER, a citizen of the United States, residing at Deadwood, in the county of Lawrence and State of South Dakota, have invented certain new and useful Improvements in the Art of Separating Precious Metals, of which the following is a specification.

This invention relates to those processes of separating the precious metals wherein the slag and matte are treated with lead, which takes up the precious metals therefrom.

One method that has been practiced is to remelt the matte in the presence of lead added to the furnace as any other ore would be added. This gives about the result that could be obtained in ordinary lead-smelting and permits the use of difficult slags in the first or dry smelting, but not in the lead-smelting. It has also been proposed to effect the reduction of the ores, and consequently the formation of the matte and slag, above a pot or crucible which has been filled with molten lead; also, to run the slag and matte from an ordinary blast or other suitable furnace in which the ores are reduced into a vessel, where the slag and matte are separated and the matte subjected to the action of molten lead that has been placed in a pot located in the vessel and communicating at the bottom therewith, all as disclosed in United States patent of Devereux, No. 381,119. Still other ways of treating the matte with lead have been practiced; but none of them, so far as I am aware, have the characteristic features of my invention.

According to my process the matte when formed and without being solidified and remelted is subjected to the action of a lead-bath, which is passed under and in contact with the matte. This may be done in the crucible or on the hearth of any suitable furnace—as, for instance, an ordinary blast-furnace—in which the smelting or reduction of the ores is accomplished, or the matte, and slag also, if desired, may be run into an adjacent crucible or vessel, which may, if desired, be exteriorly heated, and there subjected to the bath of lead which is caused to pass under it.

Features of my invention which I deem of importance are that I provide for the superheating of the lead to temperatures considerably beyond that required for perfect fusion and also that the molten lead is supplied under the matte under a suitable and sufficient pressure to cause a partial or complete impregnation or mixing of the lead and matte and slag also if the slag be treated with the matte. For the purposes of this latter feature of my invention I prefer to employ the adjacent crucible or vessel above mentioned, which, being closed, permits of the impregnation of the matte by the lead. A convenient mode of supplying the lead under pressure is to give it a sufficient gravity fall. It may be melted and superheated in any convenient or suitable way.

In the accompanying drawing the figure is a vertical central section illustrating one form of apparatus that may be employed wherein the superheated lead-bath is passed under the matte in the hearth or crucible of an ordinary stack or blast furnace.

The drawing is merely illustrative of the apparatus that I may employ, and obviously my improved process is in no way dependent thereon.

Referring to the drawing, A is an ordinary blast-furnace, of which B is the relatively deep hearth or crucible having a tap-hole C, through which the slag may be drawn off, if desired, and one D for withdrawing the matte and lead. The lead is heated in a pot or vessel E, placed in a furnace of which F is the fire-box, G the ash-pit, and F' the flue.

H is a pipe extending across the flue and located in an enlargement thereof. It delivers lead from E to a box I, closing the top of the channel K, formed in the wall of the crucible and opening into the bottom thereof. A gate-valve L, controlled by a threaded spindle passing through a stuffing-box L' in the top of the box I, serves to open or close the delivery end of the pipe H. Opposite the channel K there is formed in the wall of the crucible a similar channel K', communicating at the bottom with the crucible and opening at the top laterally through the wall thereof and which may be closed by a gate-valve I'.

The furnace is provided with ordinary twyers and other adjuncts of a blast-furnace.

As the smelting proceeds the matte forms in the crucible with the slag floating on it. The molten lead, which may be superheated, passes through H, I, and K to the bottom of the crucible and may be kept continually flowing under and in contact with the matte by regulating the discharge-opening of the channel K' by means of the gate-valve I'. The flow of the lead may be retarded so as to retain it in contact with the matte, and the supply of lead may be controlled by the gate-valve I. With a constant supply of lead passing the gate-valve I and the gate-valve I' closed or but partially open, while the flow of lead under the matte would be checked its level within the crucible would of course rise. By such an organization I may maintain a continuous flow of lead of such volume as is required under and in contact with the matte, and the lead may be heated substantially to any desired temperature.

I claim as my invention—

1. The herein-described improvement in the art of separating gold and silver from ores which consists in smelting the ores to produce a matte and while the matte is still fluid maintaining a bath of molten lead which is caused to flow beneath the matte, and to extract the precious metals therefrom.

2. The herein-described improvement in the art of separating gold and silver from ores which consists in smelting the ores to form a matte and while the matte is still fluid causing a bath of molten lead to flow continuously beneath the matte and to extract the precious metals therefrom in transit.

3. The herein-described improvement in the art of separating gold and silver from ores which consists in smelting the ores to form a matte and maintaining continuously below the furnace charge a bath of molten lead which is caused to flow beneath the matte and to extract the precious metals therefrom.

4. The herein-described improvement in the art of separating gold and silver from ores which consists in smelting the ores and while the matte is still fluid passing under and in contact with it a stream of superheated molten lead.

5. The herein-described improvement in the art of separating gold and silver from ores which consists in smelting the ores to form a matte, and while the matte is still fluid maintaining a bath of superheated molten lead which is caused to flow beneath the matte and to extract precious metals therefrom.

6. The herein-described improvement in the art of separating gold and silver from ores which consists in smelting the ores, then while the resultant matte is still fluid, passing under and in contact with it a stream of molten lead under pressure, and in supplying additional molten lead as lead is withdrawn from below the matte.

7. The herein-described improvement in the art of separating gold and silver from ores which consists in smelting the ores, maintaining a bath of molten lead beneath the matte, supplying superheated lead to the bath at a point below the matte, and in withdrawing lead from the bath without exhausting it, substantially as described.

In testimony whereof I have hereunto subscribed my name.

FRANKLIN R. CARPENTER.

Witnesses:
ARTHUR HOWE CARPENTER,
EDWIN VANLISE.